No. 677,493. Patented July 2, 1901.
H. L. ARNOLD.
REVERSING MECHANISM.
(Application filed Oct. 11, 1900.)

(No Model.) 3 Sheets—Sheet 1.

Witnesses:

Inventor,
Horace L. Arnold,
By his Attorney
F. A. Richards.

THE NORRIS PETERS CO., PHOTO-LITHO., WASHINGTON, D. C.

No. 677,493.  
H. L. ARNOLD.  
REVERSING MECHANISM.  
(Application filed Oct. 11, 1900.)  
Patented July 2, 1901.

(No Model.)

Witnesses:—

Inventor,  
Horace L. Arnold,  
By his Attorney  
F. H. Richards.

No. 677,493. Patented July 2, 1901.
H. L. ARNOLD.
REVERSING MECHANISM.
(Application filed Oct. 11, 1900.)
(No Model.)
3 Sheets—Sheet 3.
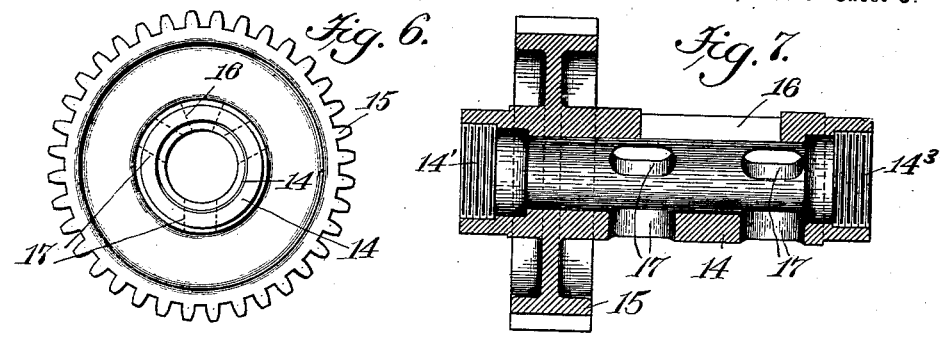
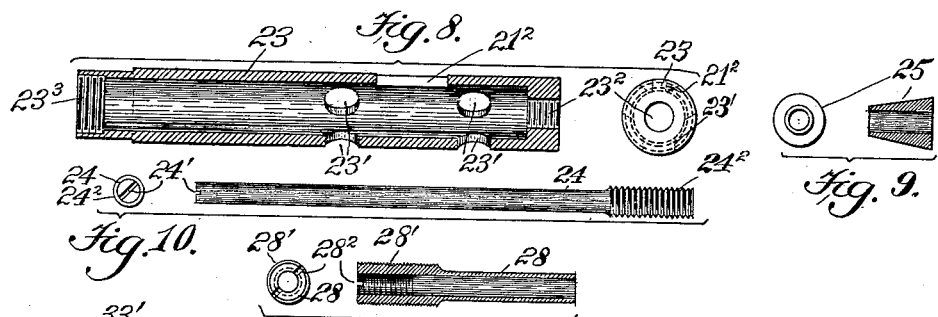
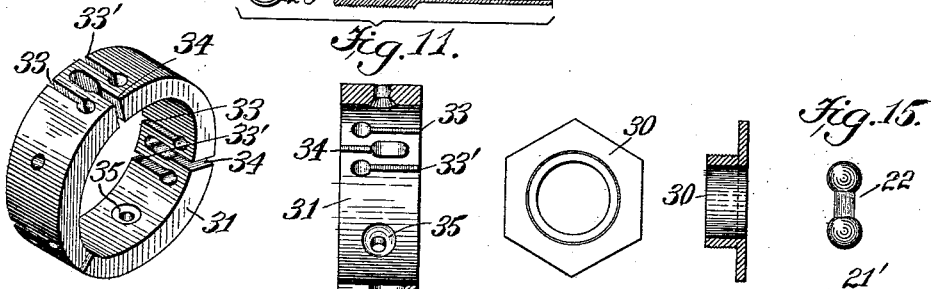
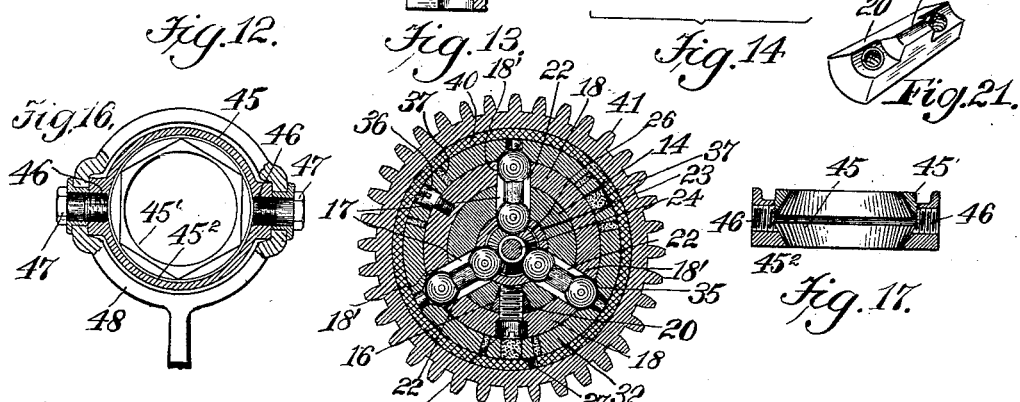
Witnesses:
Inventor,
Horace L. Arnold,
By his Attorney
F. A. Richards.

UNITED STATES PATENT OFFICE.

HORACE L. ARNOLD, OF BROOKLYN, NEW YORK, ASSIGNOR TO JOHN A. HILL, OF NEW YORK, N. Y.

REVERSING MECHANISM.

SPECIFICATION forming part of Letters Patent No. 677,493, dated July 2, 1901.

Application filed October 11, 1900. Serial No. 32,717. (No model.)

*To all whom it may concern:*

Be it known that I, HORACE L. ARNOLD, a citizen of the United States, residing in Brooklyn, in the county of Kings and State of New York, have invented certain new and useful Improvements in Reversing Mechanism, of which the following is a specification.

My invention relates to reversing mechanism suitable for use in various relations, but which is more particularly designed for employment in motor-vehicles driven by motors turning constantly in but one direction, although it is not limited thereto.

Primarily, the object of the invention is the provision of a reversing mechanism including two clutches so arranged that only one clutch can be engaged at a time and also so that both clutches may be simultaneously thrown out of engagement, if desired.

A further object of the invention is the provision, in connection with a reversing mechanism, of clutches which will be efficient under partial engagement, so that with a constant driving speed and without interposed change-speed mechanism between the driving-shaft and the driven shaft other than a partly-engaged slipping clutch a slower motion than is due to the driving-shaft and the interposed gearing may be imparted with certainty to the driven shaft.

A further object of the invention is the provision, in connection with a reversing mechanism, of a clutch which will act as a brake, and thus retard the movement of the driven shaft without stopping it, and which, although capable of being very rapidly thrown into engagement, yet will not be positive and unyielding in action, since an instantaneous and rigid clutch engagement might result in breakage of the gear-teeth of the reversing mechanism and in the case of a motor-vehicle injury to the pneumatic or other resilient tires, which are abraded if caused to slide on the roadway.

Figure 1:
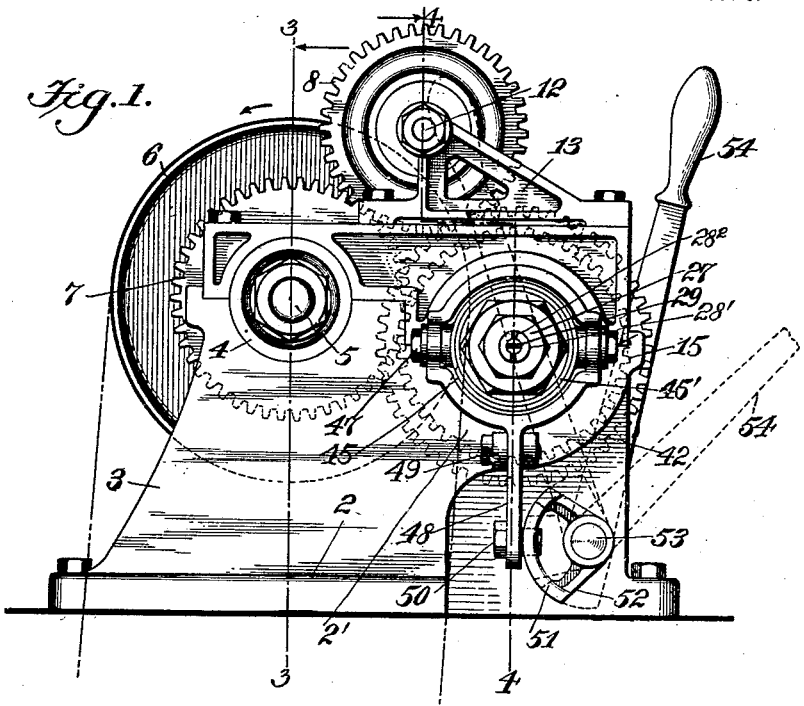
Figure 2:
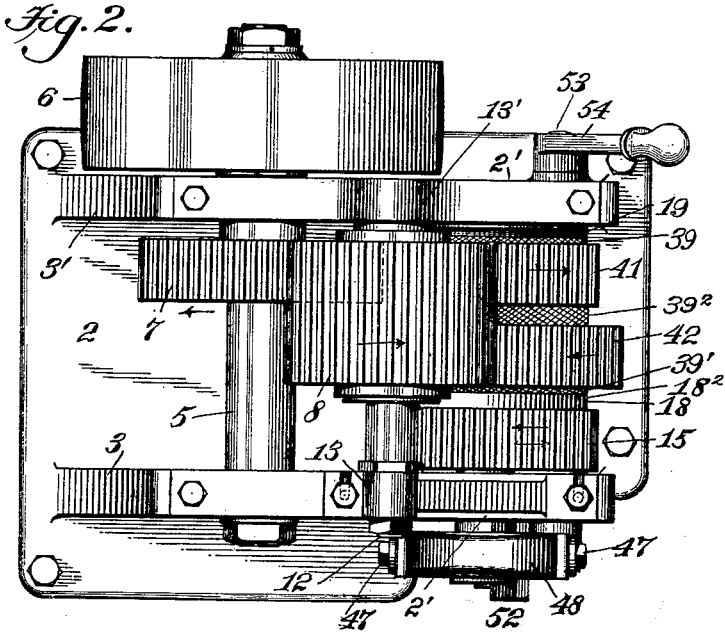

In the accompanying drawings, Figure 1 is an end view of my improved reversing mechanism. Fig. 2 is a plan view. Fig. 3 is a vertical section on line 3 3, Fig. 1, looking in the direction of the arrow. Fig. 4 is a section on line 4 4, Fig. 1, looking in the direction of the arrow. Fig. 5 is a plan view of one of the antifriction-bands of vulcanized fiber or equivalent material to be applied to the peripheries of the expansible clutch-rings in the improved reversing mechanism. Fig. 6 is an end view of the driven shaft of the reversing mechanism, showing the gear-wheel thereon. Fig. 7 is a longitudinal vertical section of said driven shaft and gear-wheel. Fig. 8 represents in longitudinal vertical section and in end elevation the toggle-actuating sleeve of the reversing mechanism. Figs. 9, 10, and 11 are details of the devices employed for adjusting the toggles. Figs. 12 and 13 are respectively a perspective view and a vertical section of the clutch-ring. Fig. 14 represents end and sectional views of a short flanged sleeve employed in connection with the driven shaft. Fig. 15 is a side view of one of the toggles. Figs. 16 and 17 are sectional details of parts carried by the lever for actuating the reciprocatory sleeve. Fig. 18 is a vertical section of the parts for clutching one of the gear-wheels to the driven shaft. Fig. 19 is a detached view of the head for actuating the clutch-operating lever and showing the cam-slot therein. Fig. 20 is an enlarged sectional detail of the means carried by the lever for operating the reciprocating sleeve, and Fig. 21 is a perspective view of a key hereinafter described.

Similar characters designate like parts throughout the several views.

Referring to the drawings, the numeral 2 designates a bed-plate having vertical standards 3 3', provided with four-point ball-bearings 4 4' for the reception of a driving-shaft 5, carrying a pulley 6 or other instrumentality to which power may be applied. Keyed to this driving-shaft 5 is a gear-wheel 7, in mesh with a long pinion 8, mounted on four-point ball-bearings 9 of a sleeve 10, fitted on a tie-rod 12, carried in brackets 13 13', secured to the framework of the machine.

Journaled in offset portions 2' of the standards 3 3' is a hollow shaft or spindle 14, carrying a gear-wheel 15, through which power may be transmitted to any desired gearing, and this shaft is provided with a key-slot 16 and with a series of short slots 17 for a purpose hereinafter stated, and surrounding this hollow shaft or spindle 14 is a sleeve 18, having a series of openings 18' and a flange $18^2$, said flange being forced against the side of the gear-wheel 15 by the threaded sleeve 30', hereinafter described, as illustrated in Fig. 4. At its opposite end this sleeve 18 bears against a collar or washer 19, which surrounds the end of the shaft 14 and is located between the end of the sleeve and the inner side of one of the offset portions 2' of the frame, and in these offset portions are ball-bearings $14^2$, in which the extremities of the spindle 14 are mounted. This sleeve 18 is secured to the spindle 14, so as to rotate therewith, by means of a wedge-shaped key 20, having radial sides entering the slot 16 in the shaft 14, and a teat or projection 21', which enters a long slot $21^2$ in a spindle 23, as illustrated in Figs. 4 and 8, screws 21 passing through said sleeve 18 and entering said key, as seen in said figures.

Designated, respectively, by the numerals 22 and 22' are sets of toggle members having hardened globular ends, the shanks of which toggle members are received in the slots 17 of the spindle 14 and the globular ends of which pass through the perforations 18' in the sleeve 18.

Fitted within the tubular shaft or sleeve 14 for endwise reciprocatory movement is a sleeve or spindle 23, having perforations 23' for the reception of the globular ends of the toggle members or pins 22 22' and a slot $21^2$, as above set forth, and fitted within this sleeve 23 is a rod 24, carrying oppositely-disposed cones 25 and 26 for subserving a purpose hereinafter stated.

At one end the sleeve 23 is provided with an opening $23^2$ of small diameter, having threaded walls, and at its opposite extremity the sleeve is interiorly threaded at $23^3$ for the reception of an externally and internally threaded thimble 27, within which is fitted a tube 28, having an enlarged externally and internally threaded end $28'$, in which is formed a nick or slot $28^2$ for the reception of a screw-driver or suitable tool. At its end opposite the threaded portion the tube 28 bears against the cone 26, and by advancing said tube and forcing the cone inward the toggle members bearing against said cone may be adjusted to cause them to apply more enlarging effect to the expansible ring when the sleeve is reciprocated or to take up wear or lost motion.

At one end the rod 24 is provided with a notch 24' for the reception of a screw-driver, and the opposite end of said rod is enlarged and externally threaded in $24^2$ to fit the internal thread $23^2$ in the sleeve 23. As the cone 25 is secured to the rod adjacent to the threaded end $24^2$, it will be seen that by turning the rod said cone may be moved to adjust the toggles bearing against it when desired. To lock the tube 28 and rod 24 and at the same time close the end of said tube, a screw-plug 29, having a smooth end and bearing against the rod, is threaded into said tube 28, as shown in Fig. 4, and when it is desired to adjust said rod and tube for the purpose stated the screw-plug is withdrawn, and when the adjustment is accomplished it is replaced in the position shown.

To secure the lower sections of the four-point ball-bearings in place on the hollow shaft or spindle 14, short externally-threaded flanged sleeves 30 30' are inserted in the externally-threaded ends 14' $14^3$ of said shaft or spindle, as illustrated in Fig. 4, the other sections of said bearings being connected to the framework in any desired way.

Surrounding the sleeve 18 between the flange $18^2$ and the collar or washer 19 are expansible clutch-rings 31 32 of peculiar construction, each consisting of an annulus of metal (usually steel) provided with a series of separated sets of slots of keyhole shape, two of the slots 33 33' of each set being cut from one side of the ring, their enlarged ends terminating near the opposite side of said ring and the third intermediate slot 34 being cut from said opposite side of the ring and its enlarged end being located adjacent to the side from which the other two slots commence. Between each set of slots a socket 35, which may be bushed, if desired, is formed in the inner wall of the ring for the reception of the globular ends of the toggle members 22. To attach these expansible rings to the sleeve 18, a screw 36 is inserted through the enlarged portion of one of the slots 34 in each ring, the threaded end of said screw entering said sleeve 18, as illustrated in Fig. 18, and to secure proper lubrication between the parts the slots 33, 33', and 34 are filled with felt packing 37, saturated with a suitable lubricant, as shown in said figure.

Located upon the sleeve 18 and between these expansible rings 31 32 is a washer 38 of indurated, preferably vulcanized, fiber, and between the sides of said rings the flange $18^2$, collar 19, and the gear-wheels 41 42, hereinafter described, are flat rings of similar fiber 39 39', said rings serving not only properly to position the clutch-rings upon the sleeve 18, but also as antifriction-surfaces against which the expansible rings and gear-wheels bear when revolving.

Fitted over the expansible clutch-rings 31 32 are bands 40 40' of antifriction material and of peculiar construction, each of which bands consists of a flat strip of indurated fiber having a tenon $40^2$ at one end and a slot $40^3$ at its opposite extremity for the reception of said tenon, the bands being simply lapped around the expansible rings, their tenoned ends being inserted in the slots $40^3$. Normally loosely surrounding these antifriction-bands are gear-wheels 41 and 42, one of which is in mesh with the long pinion 8, above described, and the other with the gear 7, one of said gear-wheels being intended when locked to its shaft for driving said shaft in one direction and the other gear-wheel when similarly locked for operating said shaft in the opposite direction. It will be observed by reference to Fig. 4 that the sets of toggle members 22 22' cant or tilt toward each other and that therefore when the sleeve 23 is reciprocated in one direction one set of toggles will be made to approach an effective vertical position and the other set will be thrown still further out of action, the result being that the shaft or spindle 14 will be driven in one direction or in the other direction when the desired set of toggles is straightened by the reciprocation of said sleeve. In Fig. 4 the toggles are shown in a neutral position, and the gear-wheels 41 and 42 therefore revolve loosely upon the antifriction-bands 40 40'. Fitted in a seat formed on the outer end of the sleeve or hollow spindle 23 are ball-bearing cup-sections 43, which are secured in position in said seat by the flange of the thimble 27, as illustrated in Fig. 4, and located over the sections 43 are the complemental ball-cup sections 44 of the four-point ball-bearings employed. Surrounding the sections 44 of said bearings is a cap-ring 45, having conical internal walls, said cap-ring being formed of sections $45'$ $45^2$, the former being threaded into the latter. (See Figs. 17 and 20.) In the section $45^2$ of this cap-ring threaded seats 46 are provided for the reception of studs or trunnions 47, carried by the yoke-shaped end of a lever 48, pivoted at 49 to a bracket projecting from the side of the machine-frame, and at its lower end this lever 48 is provided with a stud 50, which may bear an antifriction-roller and which is received in and operated by a slot 51, of peculiar construction, formed in the head 52 of a rock-shaft 53, journaled in bearings of the machine-frame, to which shaft an operating-lever 54 is applied. As will be seen by reference to Figs. 4 and 19, the cam-slot 51 in the head 52 is of peculiar formation, it having a neutral portion $51'$ intermediate its length and oppositely-inclined active portions $51^2$ $51^3$ adjacent to said neutral portion, and also having at each extremity other neutral and locking portions $51^4$, which will when the head is shifted to extreme positions serve to lock the lever in the position to which it has been thrown.

In the operation of my improved reversing mechanism power is applied to the pulley 6 or other element attached to the shaft 5, and this power is transmitted by the pinion 7 to the gear 41 and the long pinion 8, which is, as before stated, in constant engagement with the gear 42. In Fig. 4 the lever 54 and cam-slot 51 are shown in their inoperative positions, the roller carried by the lever being in the neutral middle portion $51'$ of said slot. If it should be desired to start the shaft 14 in a forward direction, as shown by the arrow on gear-wheel 41 in Fig. 2, the lever 54 would be shifted, and the cam-slot 51 in head 52 will as said head turns under the influence of the shaft 53 throw the lower end of said lever 48 to the left and its upper end to the right, thereby reciprocating the sleeve 23 within the tubular shaft or spindle 14 and causing said sleeve to throw the set of toggles 22 to a perpendicular position, thereby causing the globular ends of said toggles, which are fitted in sockets 35 of the clutch-ring 32, to expand said ring and crowd the band $40'$, surrounding the same, tightly against the inner surface of the gear-wheel 41, thereby locking said gear-wheel securely to its shaft. If at any time it should be desired to reverse the motion of the shaft 14, and consequently the gearing with which the pinion 15, carried by said shaft, is in engagement, a reverse motion of the lever 54 will cause the sleeve 23 to be reciprocated toward the left and will throw the toggles 22 out of action and the toggles $22'$ into action, thereby expanding the clutch-ring 31 and causing the band 40, surrounding the same, to be compressed and forced under pressure against the inner side of the gear-wheel 42, thus locking said gear-wheel to the shaft, causing, as stated, the mechanism to be driven in the reverse direction. If it is desired to decrease the speed of the mechanism when driven in either direction, this may be accomplished by so manipulating the lever 54 that the sleeve 23 will be partially reciprocated, thereby slightly relieving the pressure of the toggles upon the clutch-ring which has been expanded and causing a dragging or brake action of the parts, which will result in slowing down the motion. As will readily be seen, this slipping engagement of the clutch is, when the reversing mechanism is employed with a motor-vehicle, of great utility, the clutch acting as a brake, and thus retarding the movement of the driving-wheels, without stopping them, and also in this connection the clutch engagement, although it must be capable of being very rapidly established, must not be positive in action, since an instantaneous and rigid clutch engagement would result in breakage of the gear-wheels and a too sudden stoppage of the driving-wheels.

By adjusting the cones 25 26, against which the inner globular ends of the toggles bear, a speedy, delicate, and certain adjustment of pressure on the clutch-engaging surfaces may be effected, and said cones also prevent the toggles from resisting disengaging impulse even when they are located at right angles with the clutch-engaging surfaces. By locating all the clutch-engaging surfaces and their actuating parts inside the driving-gears, which only occupy the normal space demanded by the faces of their teeth and their suitable pitch diameters, a compact construction reliable in operation and efficient in use is provided and one which will occupy the least possible space—an important desideratum in motor-vehicles.

No claim is made to the improved clutch shown and described, for it constitutes the subject-matter of my application filed December 17, 1900, Serial No. 40,074.

While the invention is shown applied to reversing mechanism of a certain kind, it is not limited thereto, and, furthermore, many of the improvements above described may be employed in other relations than those shown without departing from the invention.

My invention is not limited to the exact details shown and described, for many modifications could be made that would be within the purview thereof.

The gears 41 and 42 and the clutch-rings and adjacent parts may, if desired, be applied directly to the tubular shaft without departure from the invention, the sleeve being in such case omitted.

Having thus described my invention, what I claim is—

1. In reversing mechanism, the combination, with a tubular shaft; of expansible clutch-rings carried by said shaft; gears loosely mounted with relation to the shaft; sets of toggles adapted to engage the clutch-rings, to expand the same and lock the gears in position; a reciprocatory device mounted within the shaft and adapted to actuate the toggles; and means for reciprocating said device.

2. In reversing mechanism the combination, with a hollow shaft having a series of openings, of expansible rings loosely mounted with relation to said shaft; gear-wheels loosely surrounding the rings; means for driving said gear-wheels; a series of sets of toggles for expanding the rings; and means located within the hollow shaft for actuating said toggles.

3. In reversing mechanism, the combination, with a hollow shaft, said shaft having a series of openings; a gear carried by said shaft; a sleeve secured to said shaft and also having a series of openings in line with those of the shaft; a series of toggles having globular ends; an expansible ring surrounding the sleeve; a gear-wheel surrounding said ring; a tubular spindle movable within the hollow shaft and having openings for the reception of the inner globular ends of the toggles; and means for reciprocating said spindle.

4. The combination, with a driving-shaft, of a gear carried by said shaft; a driven shaft; a gear loosely mounted thereon and in mesh with the gear of the driving-shaft; a second gear also loosely mounted on said driven shaft; a pinion intermediate said second gear on the driven shaft and the gear on the driving-shaft; devices for clutching the loosely-mounted gears to the driven shaft at will; and means including a movable part having a cam-slot with neutral and active portions for actuating the clutching devices.

5. The combination, with driving mechanism, of a driven shaft; expansible rings loosely mounted with relation to said shaft; bands of antifriction material surrounding said rings; gear-wheels surrounding said bands; a series of toggles for expanding the rings and thereby locking the desired gear-wheel to the shaft; means for adjusting said toggles; and means for actuating the toggles.

6. The combination, with driving mechanism, of a driven shaft carrying a power-transmitting element; expansible rings loosely mounted with relation to said shaft; gear-wheels surrounding said rings; sets of devices for at will expanding one of said rings; means for adjusting said devices; and means for actuating said devices.

7. The combination, with driving mechanism, of a tubular driven shaft having a series of openings; an expansible clutch-ring loosely mounted with relation to said shaft; an antifriction-band of indurated fiber surrounding said clutch-ring; a gear-wheel loosely mounted upon said band; a series of toggles; a reciprocatory device located within the tubular shaft and adapted to actuate said toggles; means for adjusting said toggles; a lever for actuating said reciprocatory device; and a movable head having a cam-slot provided with a neutral and an active portion for actuating said lever.

8. The combination, with driving mechanism, of a driven shaft; expansible rings loosely mounted with relation to said driven shaft; sets of toggles for expanding said ring; gear-wheels supported upon the rings; a tubular spindle for actuating the toggles; cones within said spindle for adjusting said toggles; means for adjusting said cones; and means for reciprocating the tubular spindle.

9. The combination, with a tubular shaft, of sets of toggles; means for actuating said toggles; expansible rings loosely mounted with relation to the shaft; gear-wheels loosely mounted with relation to said rings; means for driving said gear-wheels; a reciprocatory device for actuating the toggles; cones against which the inner ends of the toggles bear; and means for adjusting the cones.

10. The combination, with a tubular shaft having a series of openings, of a hollow spindle having a series of openings and mounted within the shaft; sets of toggles having globular ends; a device for actuating said toggles; means located within the hollow spindle for independently adjusting each set of toggles; expansible rings loosely mounted with relation to the shaft; gears loosely surrounding said rings; and mechanism for driving said gears in reverse directions.

11. The combination, with a tubular shaft having a series of openings, of a hollow spindle also having a series of openings; expansible rings loosely mounted with relation to the shaft; toggles for expanding said rings; gears driven in reverse directions and loosely mounted on the shaft; means for driving said gears; a lever for reciprocating the hollow spindle; a rock-shaft; and a head carried by said rock-shaft and having a cam for actuating the lever.

12. The combination, with driving mechanism, of a tubular shaft having a series of openings; expansible rings loosely mounted with relation to said shaft; gear-wheels mounted on the rings; means for driving said gears; toggles having rounded ends the upper portions of which fit within sockets in the rings; a hollow spindle located within the tubular shaft and provided with openings for the reception of the inner ends of the toggles; means carried by said spindle for adjusting the toggles; a pivoted lever connected with one end of the spindle and adapted to reciprocate the same; a rock-shaft; and a head carried by said rock-shaft, said head having a cam-slot formed with neutral and active portions.

13. The combination, with a driving-shaft, and a gear carried by said shaft, of a long pinion in mesh with said gear; a tubular shaft; expansible clutch-rings loosely mounted with relation to said shaft; gear-wheels supported by said clutch-rings, one of the gear-wheels being in mesh with said long pinion and the other with the gear-wheel carried by the driving-shaft; toggles for actuating the expansible rings to lock the gear-wheel desired to the tubular shaft; means for adjusting said toggles; means for actuating said toggles; a pivoted lever; ball-bearings connecting said lever with the means for actuating the toggles; a rocker having a cam-slot and formed with neutral active and locking portions; and means for actuating said rocker.

14. The combination, with a tubular shaft having a series of openings, of a reciprocatory spindle located within and rotating with said shaft; toggles fitted within the openings of the shaft and adapted to be actuated by said spindle as it is reciprocated; clutch devices actuated by said toggles; gear-wheels controlled by the clutch devices; means for driving said gear-wheels; a pivoted lever in which one end of the spindle is journaled; and a movable device having a cam-slot provided with neutral, active and locking portions for actuating said lever.

15. The combination, with a tubular shaft having a series of openings, of a hollow spindle mounted for reciprocation within said shaft, said spindle rotating with the shaft; toggles actuated by said spindle; gear-wheels loosely mounted with relation to the shaft; means for driving said gear-wheels; expansible rings controlled by the toggles; a pivoted lever having a yoke-shaped portion; ball-bearings carried by said lever and spindle; a cap-ring carried by said spindle and having trunnions to which the yoke-shaped portion of the lever is attached; and means for actuating said lever.

16. The combination, with a shaft, of gear-wheels loosely mounted with relation to said shaft; means for driving said gear-wheels; toggles and intermediate devices for locking either of said gear-wheels so that it will rotate with the shaft; means for actuating the toggles; opposing cones upon which the inner ends of said toggles bear; and means for adjusting said cones.

17. The combination, with a tubular shaft, of gear-wheels loosely mounted with relation to said shaft; means for driving said gear-wheels; clutch devices for locking either of said gear-wheels to the shaft; cones for adjusting a part of said clutch devices; and means for independently adjusting the cones.

18. The combination, with a tubular shaft, of gears carried by said shaft; means for driving said gears; a tubular spindle mounted within said shaft, said spindle having a series of openings and being provided with internally-threaded portions at each end; toggles the inner ends of which project through said openings; clutch devices actuated by said toggles; a pair of opposing cones; an adjustable rod having an end threaded in one end of said shaft; an internally and an externally threaded sleeve located in the other end of said shaft; a tube bearing against one of the cones and having a threaded end inserted in said sleeve; and a plug threaded into said tube and serving to bear against the end of the rod and lock the parts together.

19. The combination, with a tubular shaft having a series of openings and carrying a power-transmitting device, of means for driving said shaft; a tubular spindle mounted for rotary movement with said shaft and also having a series of openings; toggles having their ends located within the openings of the spindle; an adjustable rod passing through said spindle and bearing a cone; a second cone mounted on said rod opposite the first-named cone; means for independently adjusting said cones; and devices actuated by the toggles.

20. The combination, with a tubular shaft having a slot, of means for driving said shaft; a wedge-shaped key inserted in the slot of the shaft, said key having a projection on its inner end; a sleeve surrounding said shaft; screws passing through the sleeve and entering the key; a tubular spindle located within the shaft and having a slot for the reception of the projection on the end of the key; means for reciprocating said spindle; and clutch mechanism actuated by the spindle.

21. The combination, with a tubular shaft having a series of openings, of a sleeve also having a series of openings; a key for securing said sleeve to the shaft; a hollow spindle having a series of openings and mounted for rotation with the shaft; a series of toggles having globular ends, the inner ends of said toggles being fitted within the openings in the spindle, expansible clutch-rings having sockets on their inner sides for receiving the outer ends of the toggles; gear-wheels loosely surrounding the expansible rings; means for rotating said gear-wheels in reverse directions; a rod having a threaded portion inserted in one end of the hollow spindle; a cone carried by said rod adjacent to said threaded portion; an opposing cone also carried by said rod; a tube having a threaded end; a sleeve within the spindle with which the threaded end of said tube is engaged; a pivoted lever connected with the end of the spindle and having bearings for the reception of said end; a rocker having a cam-slot with a middle neutral portion; inclined active portions at each side of said middle portions; and locking portions at its ends; and means for actuating said rocker.

22. The combination, with a hollow shaft having a series of openings, of a sleeve surrounding said shaft, and secured thereto, said sleeve also having a series of openings in line with those of the shaft; an expansible ring loosely surrounding said sleeve; a gear loosely surrounding the ring and in engagement with a part of reversing mechanism; reversing mechanism; a series of toggles for expanding the ring; a device movable within the hollow shaft and adapted to actuate said toggles; and means for operating said device.

HORACE L. ARNOLD.

Witnesses:
WM. H. BLODGETT,
F. H. HUNT.